United States Patent Office.

HERMON A. HIBBARD, OF AUGUSTA, MICHIGAN.

Letters Patent No. 106,584, dated August 23, 1870; antedated August 11, 1870.

IMPROVEMENT IN DRESSING OR TAWING SKINS.

The Schedule referred to in these Letters Patent and making part of the same.

To all whom it may concern:

Be it known that I, HERMON A. HIBBARD, of Augusta, in the county of Kalamazoo, in the State of Michigan, have invented a new and improved Mode of Dressing Skins; and I do hereby declare that the following is a full and exact description thereof.

The nature of my invention consists in a composition of matter or liquor which I use in dressing skins.

To enable others skilled in the art to use my invention, I will proceed to describe its formation and operation.

I first treat the skins in the usual way, to fit them to be dressed or tawed, which I then enter in a liquor prepared as follows:

I take, for one hundred sheep-skins, ten pounds of alum and twenty pounds of salt; forty pounds wheat flour; ten pounds of boiled potatoes, mashed fine; one hundred yolks of eggs; two gallons of new milk, and soft water sufficient to form, with the above materials, a thin paste.

I first heat the water, and dissolve therein the alum and salt, then add the potatoes, flour and milk, and, lastly, the yolks of eggs, and mix the whole thoroughly together.

In this liquor, at blood heat, I mix or stir the skins until they are thoroughly struck through, which is generally in from twenty to thirty minutes, and I then take them out and hang them to dry, and color and finish them in the usual manner for coloring and finishing kid-leather.

I do not claim the use of the articles or ingredients in the above-mentioned liquor separately, as I am aware that some of them have been used before for dressing skins; but

What I claim as my invention, and desire to secure by Letters Patent, is—

The application of the above-mentioned liquor or compound to skins for dressing them, substantially as above described.

HERMON A. HIBBARD.

Witnesses:
L. J. BROWN,
ALANSON WEBSTER.